US006543211B1

(12) United States Patent
Talbot

(10) Patent No.: US 6,543,211 B1
(45) Date of Patent: Apr. 8, 2003

(54) CROP HARVESTING HEADER WITH ANGLE ADJUSTMENT OF THE KNIFE GUARDS

(75) Inventor: Francois R. Talbot, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 17 days.

(21) Appl. No.: 09/983,547

(22) Filed: Oct. 24, 2001

(51) Int. Cl.[7] .............................................. A01D 34/13
(52) U.S. Cl. .......................................... 56/296; 56/307
(58) Field of Search ........................ 56/296, 298, 299, 56/305, 307, 308, 309, 310, 173

(56) References Cited

U.S. PATENT DOCUMENTS

| 3,577,716 | A | * | 5/1971 | McCarty et al. ............... 56/259 |
| 4,246,742 | A | * | 1/1981 | Clark et al. ..................... 56/259 |
| 4,475,601 | A | * | 10/1984 | Harden et al. ............... 172/283 |
| 4,520,618 | A | * | 6/1985 | Sorensen et al. ............. 56/310 |
| 4,894,979 | A | * | 1/1990 | Lohrentz ....................... 56/305 |
| 5,241,811 | A | * | 9/1993 | Bolinger ....................... 56/310 |
| 5,456,071 | A | * | 10/1995 | Johnson ........................ 56/308 |
| 5,544,826 | A | * | 8/1996 | Klingler et al. ............. 241/242 |
| 6,305,154 | B1 | * | 10/2001 | Yang et al. .................... 56/298 |

* cited by examiner

Primary Examiner—Robert E. Pezzuto
Assistant Examiner—Meredith Petravick
(74) Attorney, Agent, or Firm—Adrian D. Battison; Michael R. Williams; Ryan W. Dupuis

(57) ABSTRACT

Crop harvesting headers include a sickle knife having a cutter bar defining a flange projecting forwardly from the header frame structure and extending across the header frame structure with a plurality of knife guards mounted on the cutter bar at spaced positions thereon so as to project forwardly therefrom. Each knife guard has at least one guard carrier lug for attachment to the flange by a bolt passing through a hole in the lug and a corresponding hole in the flange with a head on one end of the bolt and a nut on the other end of the bolt for clamping the lug to the flange. On crop harvesting headers of this type, it is often desirable to have the ability to change the knife guard angle to suit the crop and ground condition and this is obtained by providing a first elongate bar type shim located between the lug and the flange and a second shim located on the bolt. The shims are tapered front to rear and rear to front respectively each at the same set angle and are clamped on the bolt with the flange and the lug to hold the guard at a first angle relative to the flange determined by the set angle. In the method, the shims are reversed in position relative to the flange and the bolt to hold the lug at a second angle relative to the flange determined by the set angle and different from the first angle by an angle twice the set angle.

16 Claims, 2 Drawing Sheets

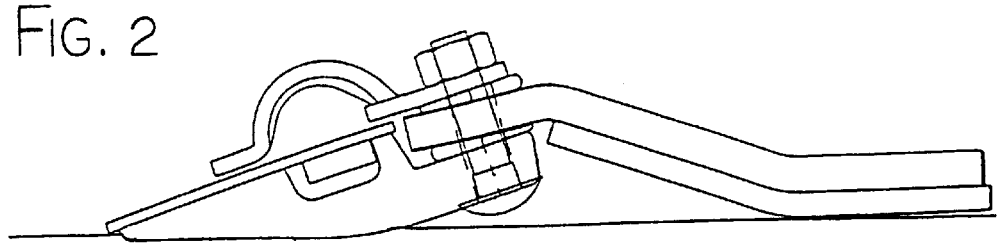
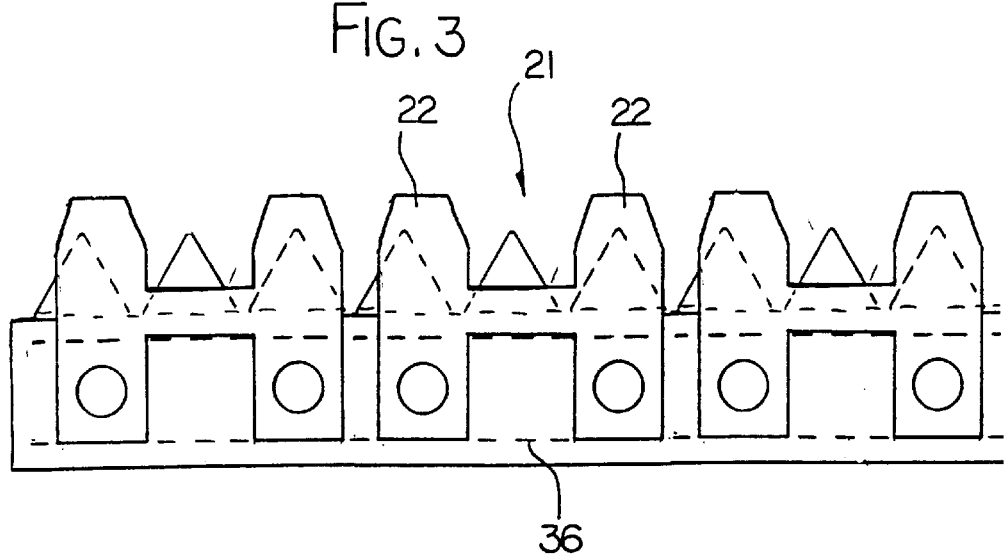
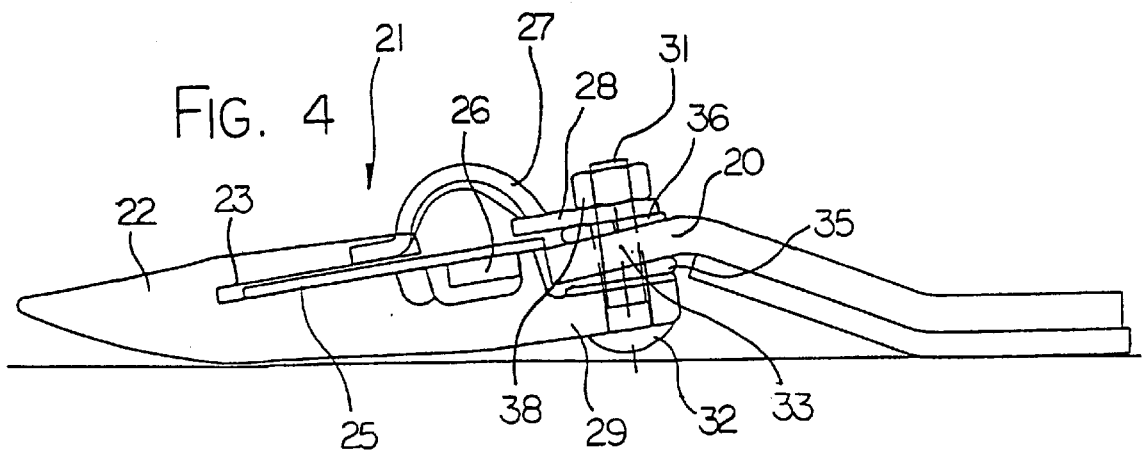

CROP HARVESTING HEADER WITH ANGLE ADJUSTMENT OF THE KNIFE GUARDS

This invention relates to a crop harvesting header including a sickle knife where the angle of the knife guards relative to the ground can be adjusted for different crop conditions.

BACKGROUND OF THE INVENTION

Crop harvesting headers, of the type with which the present invention is concerned, generally comprise a header frame structure arranged for movement in a direction of working movement across ground carrying a crop to be harvested; a cutter arranged across a forward edge of the header frame structure for cutting the crop; and a cut crop transport arrangement mounted on the header frame structure for receiving and transporting the cut crop for further processing. The cutter includes a cutter bar defining a flange projecting forwardly from the header frame structure and extending across the header frame structure with a plurality of knife guards mounted on the cutter bar at spaced positions thereon so as to project forwardly therefrom. The conventional sickle knife has a knife drive bar extending across the knife guards for reciprocating movement thereon and a plurality of knife blades carried on the knife bar for co-operation with the knife guards in a sickle cutting action. Each knife guard has at least one guard carrier lug for attachment to the flange by a bolt passing through a hole in the lug and a corresponding hole in the flange with a head on one end of the bolt and a nut on the other end of the bolt for clamping the lug to the flange.

On crop harvesting headers of this type, it is often desirable to have the ability to change the knife guard angle to suit the crop and ground condition.

For example, in some cases it is desirable to run the knife guard at a steep angle relative to the ground in order to have the tip of the knife guards of the sickle very close to the ground. This is desirable when wanting to cut a crop very close to ground (e.g. edible beans).

In other cases, it is desirable to run the knife guard at a flat angle relative to the ground to reduce damage to the knife caused by rocks and to reduce the tendency to scoop up rocks or other foreign material.

The conventional way of changing the knife guard angle has been to change the angle of the whole header platform by means of an adjustable center link. This link can be either mechanical (such as a turnbuckle screw adjustment) or a hydraulic cylinder. Typically an angle change of about 6 degrees is achievable by this method. It would be desirable to provide a substantially larger angle change to meet the requirements described above.

SUMMARY OF THE INVENTION

It is one object of the present invention to provide an improved header in which the angle of the knife guards to the ground can be adjusted.

According to a first aspect of the invention there is provided a crop harvesting header comprising:

a header frame structure arranged for movement in a direction of working movement across ground carrying a crop to be harvested;

a cutter arranged across a forward edge of the header frame structure for cutting the crop;

a cut crop transport arrangement mounted on the header frame structure for receiving and transporting the cut crop for further processing;

the cutter including a cutter bar defining a flange projecting forwardly from the header frame structure and extending across the header frame structure;

a plurality of knife guards mounted on the cutter bar at spaced positions thereon so as to project forwardly therefrom;

a sickle knife having a knife drive bar extending across the knife guards for reciprocating movement thereon and a plurality of knife blades carried on the knife bar for co-operation with the knife guards in a sickle cutting action;

each knife guard having at least one guard carrier lug for attachment to the flange by a bolt passing through a hole in the lug and a corresponding hole in the flange with a head on one end of the bolt and a nut on the other end of the bolt for clamping the lug to the flange;

and an arrangement for adjusting an angle of forward projection of the knife guards relative to the flange so as to change an angle of the knife guards relative to the ground comprising:

a first spacer element located between the lug and the flange and a second spacer element located on the bolt;

the first spacer element being shaped such that it is tapered at a set angle so that the first spacer element is thicker on the front side of the bolt and thinner on the rear side of the bolt;

the second spacer element being shaped such that it is tapered at the same set angle so that the second spacer element is thicker on the rear side of the bolt and thinner on the front side of the bolt;

the spacer elements being clamped on the bolt with the flange and the lug to hold the lug at a first angle relative to the flange determined by the set angle;

the first and second elements being arranged such that they can be reversed in position relative to the flange and the bolt so that the first spacer element is thicker on the rear side of the bolt and thinner on the front side of the bolt and the second spacer element is thicker on the front side of the bolt and thinner on the rear side of the bolt to hold the lug at a second angle relative to the flange determined by the set angle and different from the first angle by an angle twice the set angle.

Preferably the spacer elements are arranged such that the bolt is arranged at the set angle relative to a line at right angles to the flange and the head of the bolt has a face parallel to the lug.

Preferably the lug is underneath the flange and the head of the bolt butts the lug.

Preferably one of the spacer elements is on top of the flange and the other is underneath the flange.

Preferably at least one of the spacer elements comprises an elongate bar having a plurality of holes at spaced positions along the bar and each hole arranged for cooperation with a respective bolt. This is advantageous in that it allows the bar to remain held in place by other knife guards when the knife guards are replaced one at a time or individually if damaged. However other arrangements can be used, in particular individual shims for each guard or for each lug.

Preferably each guard has two lugs at spaced positions longitudinally of the flange and wherein at least one of the spacer elements comprises an elongate bar having a plurality of pairs of holes at spaced positions along the bar and each pair arranged for co-operation with a respective guard.

Preferably each of the spacer elements comprises a bar and wherein the first and second spacer elements are of the same length.

Preferably there is provided a hold-down member for engaging the knife, the hold-down member having at least one hold-down member carrier lug attached to the flange by the bolt, the guard carrier lug being located underneath the flange, the first spacer element being located between the guard carrier lug and the flange and the second spacer element being located between the flange and the hold-down carrier lug.

According to a second aspect of the invention there is provided a method for changing the effective cutter bar angle on a crop harvesting header comprising:

providing a crop harvesting header including:
- a header frame structure arranged for movement in a direction of working movement across ground carrying a crop to be harvested;
- a cutter arranged across a forward edge of the header frame structure for cutting the crop;
- a cut crop transport arrangement mounted on the header frame structure for receiving and transporting the cut crop for further processing;
- the cutter including a cutter bar defining a flange projecting forwardly from the header frame structure and extending across the header frame structure;
- a plurality of knife guards mounted on the cutter bar at spaced positions thereon so as to project forwardly therefrom;
- a sickle knife having a knife drive bar extending across the knife guards for reciprocating movement thereon and a plurality of knife blades carried on the knife bar for co-operation with the knife guards in a sickle cutting action;
- each knife guard having at least one guard carrier lug for attachment to the flange by a bolt passing through a hole in the lug and a corresponding hole in the flange with a head on one end of the bolt and a nut on the other end of the bolt for clamping the lug to the flange;

the method comprising adjusting an angle of forward projection of the knife guards relative to the flange so as to change an angle of the knife guards relative to the ground by:
- providing a first spacer element located between the lug and the flange and a second spacer element located on the bolt;
- the first spacer element being shaped such that it is tapered at a set angle so that the first spacer element is thicker on the front side of the bolt and thinner on the rear side of the bolt;
- the second spacer element being shaped such that it is tapered at the same set angle so that the second spacer element is thicker on the rear side of the bolt and thinner on the front side of the bolt;
- the spacer elements being clamped on the bolt with the flange and the lug to hold the lug at a first angle relative to the flange determined by the set angle;
- and reversing in position the first and second elements relative to the flange and the bolt so that the first spacer element is thicker on the rear side of the bolt and thinner on the front side of the bolt and the second spacer element is thicker on the front side of the bolt and thinner on the rear side of the bolt to hold the lug at a second angle relative to the flange determined by the set angle and different from the first angle by an angle twice the set angle.

The invention as defined above therefore provides a means of changing the guard angle on a header. This is done by repositioning tapered shims on both sides of the guard carrier. The shims can be reversed while remaining in the same relative location or can be switched since they are identical and merely opposite their operation.

By having the tapered shims on both sides of the guard bar, the contact surfaces for the head of the bolt and for the nut remain parallel to the face of the fastener.

The change in angle is equal to twice the angle of the shim that is repositioned. For example, if the shim angle is 5 degrees the change in knife guard angle is 10 degrees.

Preferably the shims would consist of an extricable material such as aluminium and cut into lengths such that several knife guards are securing each shim. In this manner, the shim remains secured when the knife guards are replaced.

BRIEF DESCRIPTION OF THE DRAWINGS

One embodiment of the invention will now be described in conjunction with the accompanying drawings in which:

FIG. 2 is a cross sectional view on an enlarged scale showing the cutter bar of the header with the shims in one orientation providing a steep angle of the guards, the guards being of the stub guard type.

FIG. 3 is a top plan view of the cutter bar of FIG. 2.

FIG. 4 is a cross sectional view on an enlarged scale showing the cutter bar of the header with the shims in the reversed orientation providing a shallow angle of the guards, the guards being of the standard guard type. It will be appreciated that the guards of FIGS. 2 and 4 are shown as examples and as alternatives and in practice the guards of FIG. 2 will remain in place and their angle will be changed as described herein and similarly the guards of FIG. 2 will remain in place and their angle will be changed as described herein In the drawings like characters of reference indicate corresponding parts in the different figures.

DETAILED DESCRIPTION

Figure 1:
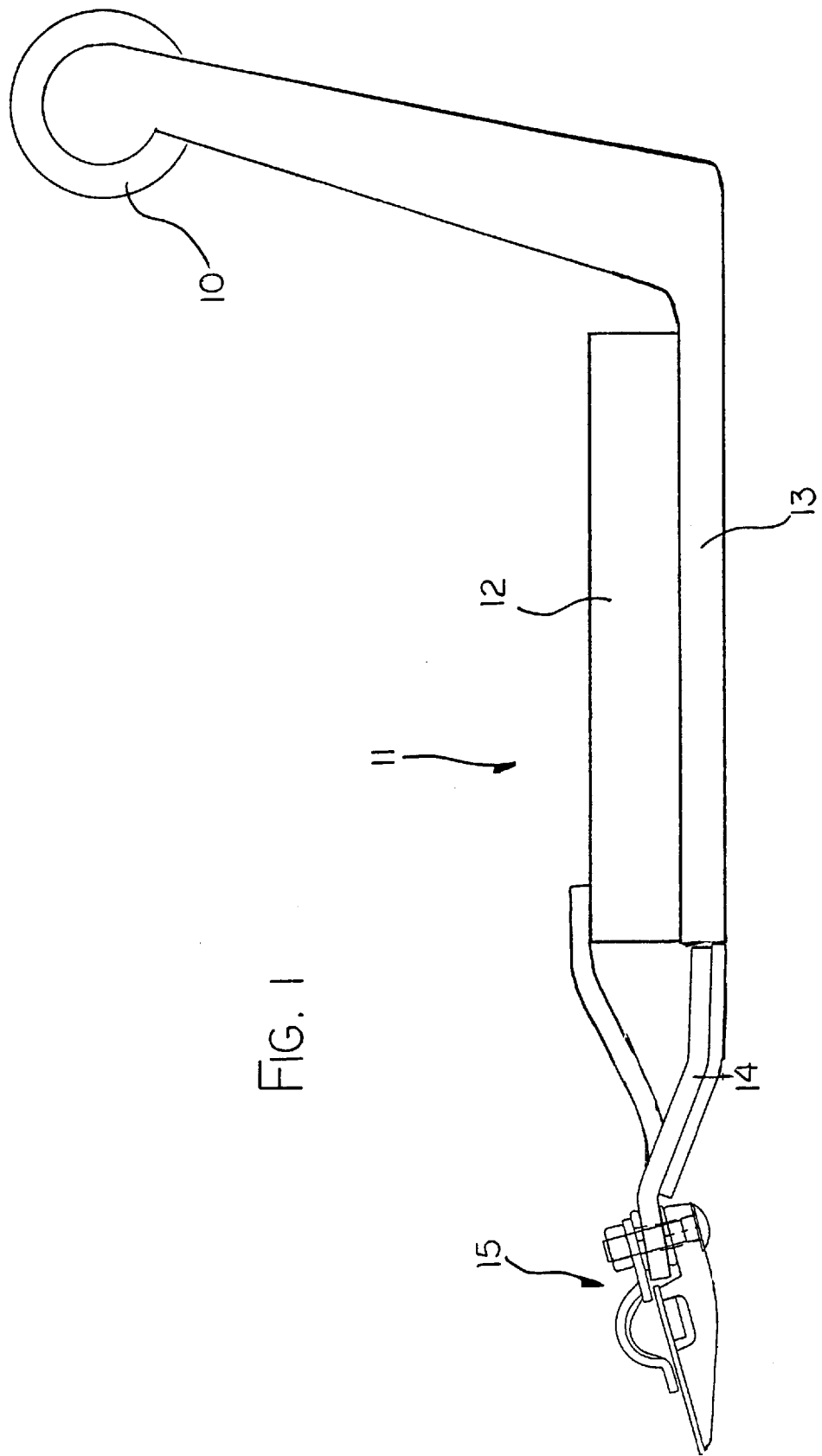
FIG. 1 is a schematic cross sectional view of a header according to the present invention.

In FIG. 1 is shown schematically the main components of a crop harvesting header which includes a main frame member 10, a table 11 on which is mounted a crop transport system, a plurality of table support arms forming part of the frame and extending from the main frame member downwardly and forwardly to a front cutter bar 14 at which is mounted a sickle knife 15.

The embodiment shown in the figures herein are merely examples and many different types are well known to one skilled in the art. The present invention may be directed to headers of the type which include a draper transport system or an auger transport system or other types of transport as may be well known to one skilled in the art. The arrangements and orientation of the cutter bar may also vary depending upon different engineering requirements. Various types of knife guards are well known and the embodiments shown are merely examples of two of those types which can be used with the principles of the present invention.

Thus as shown in FIGS. 2 and 4 the cutter bar includes a flange 20 which projects forwardly from the front of the header and provides a support for the plurality of knife guards 21. Each knife guard includes a pair of forwardly projecting fingers 22 which provides a guide slot 23 for a plurality of knife blades 25 carried on a knife bar 26 which is reciprocated back and forth by a knife drive system at one end of the header. The knife blades are held down in a cutting action by a hold down bar 27 which is attached to a mounting lug 28., Each guard includes a pair of rearwardly projecting guard mounting lugs 29 which are attached to the flange 20 of the cutter bar.

The mounting lug 28 for the hold down bar and the mounting lugs 29 for the guards are attached to the flange 20 by a bolt 31 having a head 32 and a shaft 33.

In between the top of the lug 29 and the underside of the flange 20 is provided a first shim 35 and similarly between the top surface of the flange 20 and the bottom of the lug 28 is provided a second shim 36. Each of these shims are shown in FIG. 3 as an elongate bar which is extruded from aluminium or other suitable solid material and has a plurality of holes arranged to co-operate with the bolts 31. Thus the shims may be of a length of the order of 0.5 to 1.0 meters so as to co-operate with a plurality of the knife guards which in one example might be of the order of 5 to 10.

In the examples shown each knife guard has two lugs and co-operates with a hold down bar which similarly has two lugs and clamps onto the same bolts. However other arrangements are possible.

In FIG. 4 the shim 35 is arranged so that it is thicker at the rear and thinner at the front and has a common taper angle of the order of 5°. Other angles are possible between 1° and 10° which will provide an adjustment angle of double the set angle of the shim. The shim 36 is arranged in its opposite orientation so that it is thinner at the rear and thicker at the front. This holds the lug 29 and the lug 28 at a common parallel angle at right angles to the bolt so that the surface of the head of the bolt lies flat against the underside of the lug 29 and the surface of the nut 38 of the bolt also lies flat against the plate or lug 28. The body of the bolt however lies at an angle to the flange 20 and for this reason the holes in the flange are formed so as to have sufficient clearance to allow the body of the bolt to lie at this angle and yet to be inserted through the hole in the flange. Thus the hole in the flange may be slightly oversize, or in most cases a conventional punched hole has sufficient taper due to the breakout diameter being larger than the punch diameter to accommodate this slight angle.

In the method of adjustment of the guard angle, all of the knife guards associated with a particular pair of the shims are removed and the shims reversed in orientation to take up the position shown in FIG. 2. This therefore changes the angle of the knife guard by double the set angle of the shim without any necessity for changing the angle of the flange relative to the ground.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:
    a header frame structure arranged for movement in a direction of working movement across ground carrying a crop to be harvested
    a cutter arranged across a forward edge of the header frame structure for cutting the crop;
    a cut crop transport arrangement mounted on the header frame structure for receiving and transporting the cut crop for further processing;
    the cutter including a cutter bar defining a flange projecting forwardly from the header frame structure and extending across the header frame structure;
    a plurality of knife guards mounted on the cutter bar at spaced positions thereon so as to project forwardly therefrom;
    a sickle knife having a knife drive bar extending across the knife guards for reciprocating movement thereon and a plurality of knife blades carried on the knife bar for co-operation with the knife guards in a sickle cutting action;
    each knife guard having at least one guard carrier lug for attachment to the flange by a bolt passing through a hole in the lug and a corresponding hole in the flange with a head on one end of the bolt and a nut on the other end of the bolt for clamping the lug to the flange;
    and an arrangement for adjusting an angle of forward projection of the knife guards relative to the flange so as to change an angle of the knife guards relative to the ground comprising:
    a first spacer element located between the lug and the flange and a second spacer element located on the bolt;
    the first spacer element being shaped such that it is tapered at a set angle so that the first spacer element is thicker on the front side of the bolt and thinner on the rear side of the bolt;
    the second spacer element being shaped such that it is tapered at the same set angle so that the second spacer element is thicker on the rear side of the bolt and thinner on the front side of the bolt;
    the spacer elements being clamped on the bolt with the flange and the lug to hold the lug at a first angle relative to the flange determined by the set angle;
    the first and second elements being arranged such that they can be reversed in position relative to the flange and the bolt so that the first spacer element is thicker on the rear side of the bolt and thinner on the front side of the bolt and the second spacer element is thicker on the front side of the bolt and thinner on the rear side of the bolt to hold the lug at a second angle relative to the flange determined by the set angle and different from the first angle by an angle twice the set angle.

2. The header according to claim 1 wherein the spacer elements are arranged such that the bolt is arranged at the set angle relative to a line at right angles to the flange and the head of the bolt has a face parallel to the lug.

3. The header according to claim 2 wherein the lug is underneath the flange and the head of the bolt butts the lug.

4. The header according to claim 1 wherein one of the spacer elements is on top of the flange and the other is underneath the flange.

5. The header according to claim 1 wherein at least one of the spacer elements comprises an elongate bar having a plurality of holes at spaced positions along the bar and each hole arranged for co-operation with a respective bolt.

6. The header according to claim 1 wherein each guard has two lugs at spaced positions longitudinally of the flange and wherein at least one of the spacer elements comprises an elongate bar having a plurality of pairs of holes at spaced positions along the bar and each pair arranged for co-operation with a respective guard.

7. The header according to claim 6 wherein each of the spacer elements comprises a bar and wherein the first and second spacer elements are of the same length.

8. The header according to claim 1 wherein there is provided a hold-down member for engaging the knife, the hold-down member having at least one hold-down member carrier lug attached to the flange by the bolt, the guard carrier lug being located underneath the flange, the first spacer element being located between the guard carrier lug and the flange and the second spacer element being located between the flange and the hold-down carrier lug.

9. A method for changing the effective cutter bar angle on a crop harvesting header comprising:

providing a crop harvesting header including:

a header frame structure arranged for movement in a direction of working movement across ground carrying a crop to be harvested;

a cutter arranged across a forward edge of the header frame structure for cutting the crop;

a cut crop transport arrangement mounted on the header frame structure for receiving and transporting the cut crop for further processing;

the cutter including a cutter bar defining a flange projecting forwardly from the header frame structure and extending across the header frame structure;

a plurality of knife guards mounted on the cutter bar at spaced positions thereon so as to project forwardly therefrom;

a sickle knife having a knife drive bar extending across the knife guards for reciprocating movement thereon and a plurality of knife blades carried on the knife bar for co-operation with the knife guards in a sickle cutting action;

each knife guard having at least one guard carrier lug for attachment to the flange by a bolt passing through a hole in the lug and a corresponding hole in the flange with a head on one end of the bolt and a nut on the other end of the bolt for clamping the lug to the flange;

the method comprising adjusting an angle of forward projection of the knife guards relative to the flange so as to change an angle of the knife guards relative to the ground by:

providing a first spacer element located between the lug and the flange and a second spacer element located on the bolt;

the first spacer element being shaped such that it is tapered at a set angle so that the first spacer element is thicker on the front side of the bolt and thinner on the rear side of the bolt;

the second spacer element being shaped such that it is tapered at the same set angle so that the second spacer element is thicker on the rear side of the bolt and thinner on the front side of the bolt;

the spacer elements being clamped on the bolt with the flange and the lug to hold the lug at a first angle relative to the flange determined by the set angle;

and reversing in position the first and second elements relative to the flange and the bolt so that the first spacer element is thicker on the rear side of the bolt and thinner on the front side of the bolt and the second spacer element is thicker on the front side of the bolt and thinner on the rear side of the bolt to hold the lug at a second angle relative to the flange determined by the set angle and different from the first angle by an angle twice the set angle.

10. The method according to claim 9 wherein the spacer elements are arranged such that the bolt is arranged at the set angle relative to a line at right angles to the flange and the head of the bolt has a face parallel to the lug.

11. The method according to claim 10 wherein the lug is underneath the flange and the head of the bolt butts the lug.

12. The method according to claim 9 wherein one of the spacer elements is on top of the flange and the other is underneath the flange.

13. The method according to claim 9 wherein at least one of the spacer elements comprises an elongate bar having a plurality of holes at spaced positions along the bar and each hole arranged for co-operation with a respective bolt.

14. The method according to claim 9 wherein each guard has two lugs at spaced positions longitudinally of the flange and wherein at least one of the spacer elements comprises an elongate bar having a plurality of pairs of holes at spaced positions along the bar and each pair arranged for co-operation with a respective guard.

15. The method according to claim 14 wherein each of the spacer elements comprises a bar and wherein the first and second spacer elements are of the same length.

16. The method according to claim 9 wherein there is provided a hold-down member for engaging the knife, the hold-down member having at least one hold-down member carrier lug attached to the flange by the bolt, the guard carrier lug being located underneath the flange, the first spacer element being located between the guard carrier lug and the flange and the second spacer element being located between the flange and the hold-down carrier lug.

* * * * *